F. GRAUL.
PANORAMIC TELESCOPE.
APPLICATION FILED JULY 21, 1915.
1,209,958.
Patented Dec. 26, 1916.
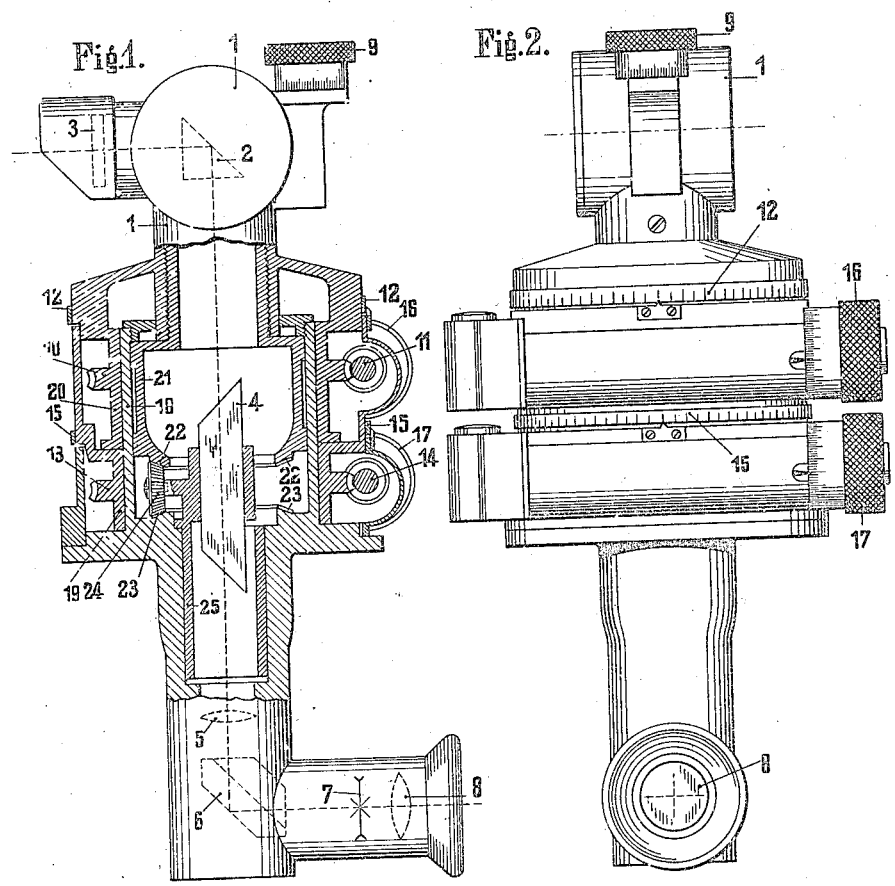

UNITED STATES PATENT OFFICE.

FRANZ GRAUL, OF VIENNA, AUSTRIA-HUNGARY, ASSIGNOR TO THE FIRM OF OPTISCHE ANSTALT C. P. GOERZ AKTIENGESELLSCHAFT, OF FRIEDENAU, NEAR BERLIN, GERMANY.

PANORAMIC TELESCOPE.

1,209,953.  Specification of Letters Patent.  Patented Dec. 26, 1916.

Application filed July 21, 1915. Serial No. 41,200.

*To all whom it may concern:*

Be it known that I, FRANZ GRAUL, engineer, a citizen of the German Empire, residing at Vienna, Austria-Hungary, have invented certain new and useful Improvements in Panoramic Telescopes, of which the following is a specification.

This invention relates to panoramic telescopes that is to say to telescopes provided with a rotatable element allowing variation of the direction of view without rotating the instrument as a whole.

More particularly the invention relates to panoramic telescopes of that kind where two angle measuring devices are provided allowing ascertaining of the direction of view with regard to certain standard directions.

The invention has for its purpose to construct panoramic telescopes of this kind in a manner allowing great exactness of angle measuring. For this purpose the instrument of this invention is provided with a hollow bearing integrally with the casing of the instrument and forming a carrier for the rotatable elements of the two measuring devices, said rotatable elements being mounted on the hollow bearing one above the other.

Instruments of the kind in question are provided with a so-called rotatable erecting prism which compensates for the effect of the variation of the direction of view and secures upright images irrespective the actual direction of view. According to a further point of this invention the hollow bearing for the rotatable elements of the two angle measuring devices forms at the same time with its inside a bearing for the actuating element of the erecting prism. The said construction wherein one and the same member which is integral with the casing of the instrument forms the carrier of the rotatable elements of the two angle measuring devices can easily be manufactured with great accuracy and consequently yields great exactness of angle measuring.

An embodiment of the invention is illustrated on the accompanying drawing wherein—

Figure 1 is a central section through and partly a view of an instrument according to the invention. Fig. 2 is an elevation of the instrument.

The rotatable head of the panoramic telescope is designated with the numeral 1. It is provided with a reflector 2 and a protective glass disk 3 preventing the rain from entering into the instrument.

The rotatable erecting prism is designated with the numeral 4.

5 is an objective, 6 a reflecting prism at the ocular end of the instrument, 7 a line and cross wire and 8 the ocular. The upper reflector 2 is adapted to be rotated by actuating the knob 9 in known manner by means of a worm gear in a horizontal plane.

10 and 13 are worm wheels and 11 and 14 worms meshing therewith and 12 and 15 are graduated scales forming part of the upper and of the lower measuring device respectively. The said scales 12 and 15 allow ascertaining of the actual position of the head of the telescope.

16 and 17 are actuating knobs for the worms 11 and 14.

The hollow shaft 18 is integral with the casing of the instrument. Mounted on said hollow shaft 18 is the hub 19 of the worm wheel 13 which rests with its lower end on a lateral extension of the hollow shaft 18. The hub 19 of the worm wheel 13 carries the hub 20 of the upper worm wheel 10, said hub 20 being likewise mounted on the hollow shaft 18. The hollow shaft 18 is shown on the drawing as a hollow cylinder. The hub 20 of worm wheel 10 is provided at the upper end with a continuation integrally with the rotatable head 1 of the instrument. Within the hollow shaft 18 is mounted a sleeve 21 which is likewise in firm connection with the rotatable head 1. This connection is shown on the drawing as a screw connection. The sleeve 21 is provided with a ring of teeth 22 meshing with a pinion 24 rotatably mounted on a pin on the bearing for the erecting prism 4. The pinion 24 is in mesh also with a ring of teeth 23 provided on the casing of the instrument and, therefore, in firm connection with the hollow shaft 18. The bearing for the erecting prism 4 is provided with a tube-like extension 25 which is likewise mounted within the hollow shaft 18 or with a contracted extension of same. The hub 19 has an upper extension which forms a casing for the worm wheel 10 and a bearing for the worm 11 which is in mesh with the worm wheel 10 as above mentioned. The worm 14 for rotating the lower worm wheel 13 is mounted in a bearing member which is in firm connection with the hollow shaft 18 and the casing of the instrument.

The operation of the device is as follows: On actuating the knob 17 the head 1 of the instrument is rotated and its direction of view may be ascertained by observation of the scale 15 with relation to its index which is immovable with relation to the casing of the instrument. The observation gives the angle between the direction of the axis of the rotatable head 1 and that of the ocular 8 provided that the index of the second graduated scale 12 coincides with the zero point of this scale. If now knob 16 is rotated the head 1 is again rotated likewise and the direction of the axis of head 1 altered. By reading the position of the index of scale 12 on said scale 12 the angle may be ascertaind between the first adjustment and the second adjustment, whereas at the same time the first adjustment may be determined at every moment by reading the position of the index of scale 15 on this scale.

The correctness of measuring of the angular adjustment of head 1 depends on the mounting of the rotatable elements of the two angle measuring devices on one and the same bearing cylinder. This kind of mounting guarantees permanent coincidence of the optical axis of the instrument and of the geometrical axis of rotation of the angle measuring devices if once established. A further improvement of the measuring correctness is obtained by mounting the actuating member 21 of the erecting prism within the same bearing member 18; it being obvious for an expert that it is very easy in working the bearing surfaces to make these surfaces absolutely co-axially. Of course the hollow shaft 18 needs not to have cylindrical surfaces but may also be made conically. The above described arrangement may be used advantageously in connection with every kind of optical instruments with a plurality of angle measuring devices and optical elements movably with relation thereto where it is necessary for exact measuring that the optical axis of the movable elements permanently coincides with the geometrical axis of rotation of the measuring devices.

What I claim is:

1. A panoramic telescope comprising a hollow bearing in firm connection with the casing of the instrument, two rotatable bodies mounted on coaxial parts of the surface of said hollow bearing, actuating members for said rotatable bodies, the actuating member for the one rotatable body mounted in bearings firmly connected to the casing of the instrument and the actuating member for the other rotatable body mounted in bearings of the first named rotatable body, the last named rotatable body carrying light receiving elements, and indicating means adapted to indicate the actual position of the first named rotatable element with relation to the casing of the instrument and the position of the last named rotatable body with relation to the first named rotatable body.

2. A panoramic telescope comprising a hollow bearing in firm connection with the casing of the instrument, two rotatable bodies mounted on coaxial parts of the outer surface of said hollow bearing, actuating members for said rotatable bodies, the actuating member for the one rotatable body mounted in bearings firmly connected to the casing of the instrument and the actuating member for the other rotatable body mounted in bearings of the first named rotatable body, the last named rotatable body carrying light receiving elements, a rotatable image erecting prism in the path of the rays coming from said light receiving elements, actuating means for said image erecting prism comprising a member connected to said light receiving elements carrying rotatable body and mounted within said hollow bearing so as to secure coincidence of its axis of rotation with the axes of rotation of said two rotatable bodies mounted on the outside of said hollow bearing, and indicating means adapted to indicate the actual position of the first named rotatable element with relation to the casing of the instrument and the position of the last named rotatable body with relation to the first named rotatable body.

3. In a panoramic telescope a cylindrical bearing member integral with the casing, a lower worm wheel mounted thereon and an upper worm wheel likewise mounted on said cylindrical bearing member and resting on said lower worm wheel, said upper worm wheel in connection with a reflector head, actuating worms for said worm wheels, the worm meshing with the lower wheel adapted to rotate both said worm wheels simultaneously about said cylindrical bearing, and the worm meshing with the upper worm wheel adapted to rotate this last named worm wheel and indicating means for ascertaining the position of the lower worm wheel with relation to the casing and the position of upper worm wheel with relation to the lower worm wheel.

4. In a panoramic telescope a hollow shaft integral with the casing, two worm wheels mounted thereon one above the other forming the rotatable elements of angle measuring devices and in mesh with actuating worms, the upper worm wheel in firm connection with the rotatable reflector head of the instrument and the lower worm wheel provided with a hub extension forming a casing for the upper worm wheel and a bearing for its actuating worm.

In testimony whereof I have signed this specification.

FRANZ GRAUL.